US012128678B2

(12) United States Patent
Momose

(10) Patent No.: US 12,128,678 B2
(45) Date of Patent: Oct. 29, 2024

(54) RECORDING DEVICE

(71) Applicant: SEIKO EPSON CORPORATION, Tokyo (JP)

(72) Inventor: Yoshihiko Momose, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 126 days.

(21) Appl. No.: 18/153,481

(22) Filed: Jan. 12, 2023

(65) Prior Publication Data

US 2023/0226832 A1 Jul. 20, 2023

(30) Foreign Application Priority Data

Jan. 14, 2022 (JP) ................................ 2022-004202

(51) Int. Cl.

| | |
|---|---|
| ***B41J 13/10*** | (2006.01) |
| ***B41J 3/28*** | (2006.01) |
| ***B41J 11/06*** | (2006.01) |
| ***B41J 11/20*** | (2006.01) |
| ***B41J 13/22*** | (2006.01) |
| ***B41J 25/00*** | (2006.01) |
| *B41J 3/407* | (2006.01) |

(52) U.S. Cl.

CPC ............... *B41J 13/103* (2013.01); *B41J 3/28* (2013.01); *B41J 11/06* (2013.01); *B41J 11/20* (2013.01); *B41J 13/22* (2013.01); *B41J 25/001* (2013.01); *B41J 3/4078* (2013.01)

(58) Field of Classification Search

CPC ... B41J 13/103; B41J 3/28; B41J 11/06; B41J 11/20; B41J 13/22; B41J 25/001; B41J 3/4078

See application file for complete search history.

(56) References Cited

U.S. PATENT DOCUMENTS

| | | | | |
|---|---|---|---|---|
| 2004/0263544 A1* | 12/2004 | Kojima | .................... | B41J 3/407 347/5 |
| 2011/0096119 A1* | 4/2011 | Ito | .......................... | B41J 2/1652 347/19 |
| 2011/0210993 A1* | 9/2011 | Kojima | .................... | B41J 3/407 347/4 |

FOREIGN PATENT DOCUMENTS

| | | |
|---|---|---|
| JP | 2021-066045 A | 4/2021 |

* cited by examiner

*Primary Examiner* — Henok D Legesse
(74) *Attorney, Agent, or Firm* — WORKMAN NYDEGGER

(57) ABSTRACT

A recording device including a medium support portion configured to support a medium, a recording unit configured to perform recording on the medium, a movement unit configured to support the recording unit, and move relative to the medium support portion along a first axis, a first guide shaft provided on one side of the medium support portion, and extending along the first axis, and a second guide shaft provided on another side of the medium support portion, and extending along the first axis, and a driving unit configured to move the movement unit along the first axis.

7 Claims, 5 Drawing Sheets

RECORDING DEVICE

The present application is based on, and claims priority from JP Application Serial Number 2022-004202, filed Jan. 14, 2022, the disclosure of which is hereby incorporated by reference herein in its entirety.

BACKGROUND

1. Technical Field

The present disclosure relates to a recording device.

2. Related Art

In the past, a recording device including a movement unit, and a recording unit provided in the movement unit has been known.

JP 2021-66045 A discloses a configuration including a gantry, which is a movement unit movable in a Y direction, and recording on a medium by a recording head provided in the gantry.

In the recording device as in JP 2021-66045 A, in order to stabilize movement of the movement unit, it is common to cause driving force to act on two or more locations of the movement unit. In this type of recording device, there has been a problem that a mechanism for causing the driving force to act on the movement unit is complicated.

SUMMARY

An aspect for resolving the above-described problems is a recording device including a medium support portion configured to support a medium, a recording unit configured to perform recording on the medium, a movement unit configured to support the recording unit, and move relative to the medium support portion along a first axis, a first guide shaft provided on one side of the medium support portion, and extending along the first axis, and a second guide shaft provided on another side of the medium support portion, and extending along the first axis, and a driving unit configured to move the movement unit along the first axis, wherein the movement unit includes a first leg portion movably supported by the first guide shaft, and a second leg portion movably supported by the second guide shaft, the driving unit applies driving force to the first leg portion, and friction force acting between the first leg portion and the first guide shaft is greater than friction force acting between the second leg portion and the second guide shaft.

DESCRIPTION OF EXEMPLARY EMBODIMENTS

1. Overall Configuration of Recording Device

Hereinafter, a recording device 1 according to Exemplary Embodiment 1 will be described with reference to the accompanying figures.

Figure 1:
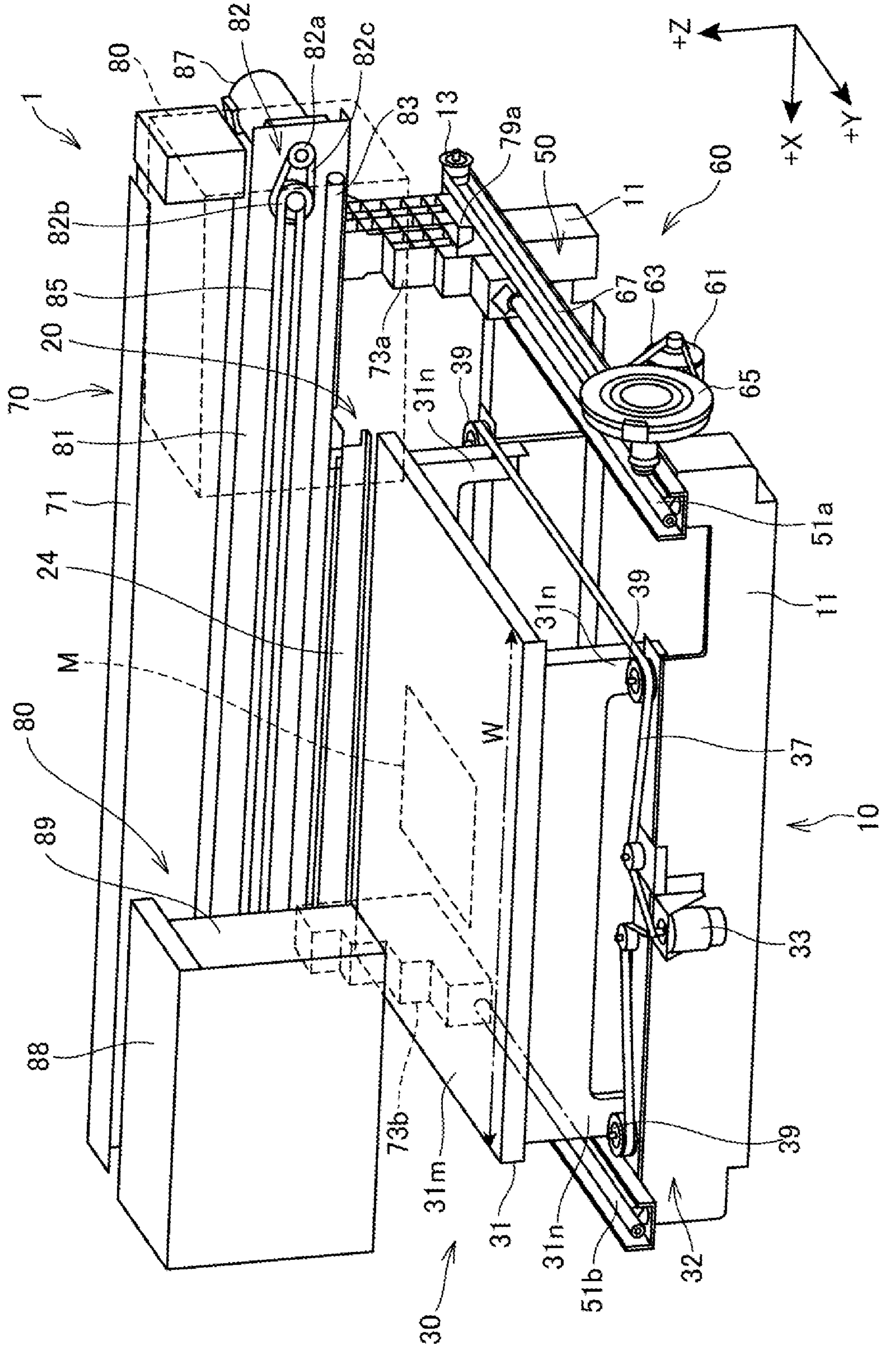
FIG. 1 is a perspective view of a recording device according to Exemplary Embodiment 1.

FIG. 1 is a perspective view of the recording device 1.

The recording device 1 illustrated in FIG. 1 is a device for recording on a medium M by a recording head 89 discharging liquid onto the medium M. The medium M is a sheet, cloth, or a three-dimensional object. The sheet may be paper, or a sheet made of a synthetic resin. The cloth may be any of a non-woven fabric, a knit, and fabric. Examples of the three-dimensional object include accessories such as clothes and shoes, daily necessities, machine parts, and various other objects. Types of the liquid that the recording device 1 discharges onto the medium M are not limited, and only need to have fluidity. For example, the recording device 1 is a printer that jets ink of one or more colors toward a surface of the medium M by the recording head 89, and forms an image on the medium M. In this case, the medium M corresponds to a printing medium.

FIG. 1 illustrates an X-axis, a Y-axis, and a Z-axis. The X-axis, the Y-axis, and the Z-axis are mutually orthogonal. The Z-axis is an axis extending in an up-down direction, and can be referred to as an axis extending in a vertical direction. The X-axis, and the Y-axis are parallel to a horizontal plane. In the following description, a direction along the X-axis is referred to as a left-right direction, and a direction along the Y-axis is referred to as a front-rear direction. Specifically, a positive direction along the −Z axis is referred to as an upward direction, a positive direction along the X-axis is referred to as a rightward direction, and a positive direction along the Y-axis is referred to as a forward direction. Each of the X-axis, the Y-axis, and the Z-axis in FIG. 1 indicates the same direction in each figure described below. The X-axis corresponds to a second axis, and the Y-axis corresponds to a first axis.

The recording device 1 includes a table 31 that supports the medium M. The table 31 is a seat that does not move in the X-axis direction and the Y-axis direction. An upper surface of the table 31 is referred to as a medium support portion 31*m*. The medium support portion 31*m* is a flat surface on which the medium M can be placed. A shape and a size of the medium M are not limited, as far as the medium M does not protrude from the medium support portion 31*m*. Additionally, an end of the medium M may protrude from the medium support portion 31*m*. A height of the medium M corresponds to a size in a +Z direction of the medium M. The height of the medium M can be any size within a range where the table 31 can be lifted and lowered as described below.

The recording device 1 supports the medium M so as not to move, by the medium support portion 31*m*, and causes the recording head 89 to perform scanning above the medium M supported by the medium support portion 31*m*, and discharges liquid from the recording head 89 onto the medium M.

The recording device 1 includes a main body 10, and a movement unit 70. The main body 10 is a seat fixed to an installation surface of the recording device 1. The movement unit 70 moves along the Y-axis relative to the main body 10.

The main body 10 includes a base portion 11, a medium support mechanism 30, and a drive mechanism 50. The base portion 11 is fixed to the installation surface of the recording device 1, and supports each unit of the recording device 1. FIG. 1 illustrates an example in which a pair of the rod-shaped base portions 11 are disposed side by side along the Y-axis.

The medium support mechanism 30 includes the table 31, and a height movement mechanism 32. The table 31 includes a rectangular flat plate, and four table leg portions 31*n* disposed at four corners of the flat plate, respectively, and an upper surface of the flat plate is the medium support portion 31*m* described above.

The height movement mechanism 32 includes a lifting/lowering motor 33, a lifting/lowering belt 37, and a lifting/lowering mechanism 39, and moves the medium support portion 31*m* in a direction along the Z-axis. The lifting/lowering mechanism 39 is provided at each of the four table leg portions 31*n*. The lifting/lowering mechanism 39 includes a ball screw, a nut that is screwed into the ball screw, and a pulley, that are disposed along the Z-axis. The ball screw of the lifting/lowering mechanism 39 is rotatably supported by the base portion 11. The nut of the lifting/lowering mechanism 39 is fixed to the table leg portion 31*n*. The pulley of the lifting/lowering mechanism 39 is fixed to a top of the ball screw. When the pulley of the lifting/lowering mechanism 39 rotates, the ball screw rotates, and the table leg portion 31*n* moves along the Z-axis together with the nut in association with the rotation of the ball screw.

The lifting/lowering motor 33 is a motor that rotates according to control of a control unit 90 described later. The control unit 90 controls a rotation direction and an amount of rotation of the lifting/lowering motor 33. The lifting/lowering belt 37 is an annular belt that is wound around an output shaft of the lifting/lowering motor 33 and the pulleys of the respective four lifting/lowering mechanisms 39. The lifting/lowering motor 37 is driven to circulate by the lifting/lowering motor 33 rotating. The lifting/lowering belt 37 transmits the rotation of the lifting/lowering motor 33 to the pulleys of the respective four lifting/lowering mechanisms 39. Accordingly, the ball screw of the lifting/lowering mechanism 39 rotates, and moves the table 31 along the Z-axis.

The rotation direction of the lifting/lowering motor 33 can be switched between a positive direction in which the table 31 is moved upward, and a reverse direction in which the table 31 is moved downward. The recording device 1 lifts and lowers the table 31 by operating the lifting/lowering motor 33.

The drive mechanism 50 includes a first guide shaft 51*a*, a second guide shaft 51*b*, and a frame drive unit 60. The first guide shaft 51*a* and the second guide shaft 51*b* are shaft-shaped members hung on the pair of base portions 11 and disposed along the Y-axis. The first guide shaft 51*a* is fixed to an end portion on a left side of each of the base portions 11, and the second guide shaft 51*b* is fixed to an end portion on a right side of each of the base portions 11.

Note that, the first guide shaft 51*a* is located on the left side of the medium support portion 31*m*. The second guide shaft 51*b* is located on the right side of the medium support portion 31*m*. The left side corresponds to one side in the present disclosure. The right side corresponds to another side in the present disclosure. That is, the first guide shaft 51*a* is provided on the one side of the medium support portion 31*m*. Further, the second guide shaft 51*b* is provided on the other side of the medium support portion 31*m*.

The movement unit 70 includes a main frame 71, a first leg portion 73*a*, a second leg portion 73*b*, and a recording unit 80.

The main frame 71 is a plate member elongated in a direction along the X-axis. A size in the left-right direction of the main frame 71 is greater than that of the base portion 11. The first leg portion 73*a* fits into the first guide shaft 51*a*, and is movable along the first guide shaft 51*a*. The second leg portion 73*b* fits into the second guide shaft 51*b*, and is movable along the second guide shaft 51*b*. The main frame 71 is fixed over the first leg portion 73*a*, and the second leg portion 73*b*, and is supported from below by the first leg portion 73*a* and the second leg portion 73*b*. The first leg portion 73*a* is located at a left end portion of the main frame 71, and the second leg portion 73*b* is located at a right end portion of the main frame 71. The main frame 71 is guided, together with the first leg portion 73*a* and the second leg portion 73*b*, by the first guide shaft 51*a* and the second guide shaft 51*b*, and moves along the Y-axis.

Note that, details of the first leg portion 73*a* and the second leg portion 73*b* will be described later.

The frame drive unit 60 includes a frame movement motor 61, a transmission belt 63, a gearbox 65, and a transmission belt 67.

Note that, the frame drive unit 60 is an example of a driving unit in the present disclosure. The frame movement motor 61 is an example of a moving motor. The transmission belts 63 and 67 are examples of a moving belt.

The frame movement motor 61 is a motor that rotates according to the control of the control unit 90 described below. The transmission belt 63 is an annular belt that is wound between an output shaft of the frame movement motor 61 and the gearbox 65, and transmits driving force of the frame movement motor 61 to the gearbox 65. The gearbox 65 includes a first pulley and a second pulley, the transmission belt 63 is wound around the first pulley, and the transmission belt 67 is wound around the second pulley. The gearbox 65 drives the transfer belt 67 by rotating the second pulley by the driving force transmitted from the transmission belt 63 to the first pulley. The gearbox 65 transmits the driving force of the frame movement motor 61 to the transmission belt 67 at a reduction ratio corresponding to a ratio of a diameter of the first pulley and a diameter of the second pulley.

The transmission belt 67 is an annular belt that is wound around the gearbox 65 and a pulley 13 disposed at an end portion in a-Y direction of the base portion 11. The pulley 13 is rotatably installed with respect to the base portion 11. The transmission belt 67 is disposed along the first guide shaft 51*a*. The first leg portion 73*a* is fixed to the transmission belt 67 via a belt coupling portion 79*a*. Thus, by the transmission belt 67 being driven to circulate, power for moving the first leg portion 73*a* along the Y-axis acts on the first leg portion 73*a*. Thus, the movement unit 70 moves along the Y-axis.

A rotation direction of the frame movement motor 61 can be switched between a positive direction in which the main frame 71 is moved in a +Y direction, and a reverse direction in which the main frame 71 is moved in the −Y direction. The recording device 1 moves the main frame 71 forward and backward by operating the frame movement motor 61.

The second leg portion 73*b* included in the movement unit 70 is guided by the second guide shaft 51*b*. Thus, the main frame 71 moves parallelly in the +Y direction and the −Y direction along the first guide shaft 51*a* and the second guide shaft 51*b*.

A carriage support frame 81, a transmission mechanism 82, a carriage guide shaft 83, and a carriage drive motor 87 are installed at the main frame 71. The recording unit 80 includes a carriage 88, and the recording head 89.

The carriage support frame 81 is a plate member elongated in the direction along the X-axis. The carriage guide shaft 83 is fixed to the carriage support frame 81 along the X-axis. The carriage 88 is supported by the carriage support frame 81 and the carriage guide shaft 83, and is movable along the carriage guide shaft 83. In a range where the carriage 88 moves along the X-axis, a position of a left end is defined as a home position. A mechanism for performing maintenance such as flushing or cleaning of the recording head 89 is disposed at the home position. In FIG. 1, the home position of carriage 88 is indicated by dashed lines.

Note that, when the carriage 88 is located at the home position, the carriage 88 does not overlap the medium support portion 31*m* in the X-axis.

The carriage drive belt 85 is an annular belt that is wound around the transmission mechanism 82 disposed at a left end portion of the carriage support frame 81, and a pulley (not illustrated) disposed at a right end portion of the carriage support frame 81. The carriage drive belt 85 is disposed along the carriage guide shaft 83.

The carriage drive motor 87 is a motor that rotates according to the control of the control unit 90 described below. The transmission mechanism 82 includes a pulley 82*a*, a two-stage pulley 82*b*, and a belt 82*c*. The pulley 82*a* is fixed to an output shaft of the carriage drive motor 87. The belt 82*c* is an annular belt that is wound around the pulley 82*a* and the two-stage pulley 82*b*. The two-stage pulley 82*b* includes a small pulley, and a large pulley with a diameter greater than that of the small pulley. The belt 82*c* is wound around the large pulley, and the carriage drive belt 85 is wound around the small pulley. The belt 82*c* is driven to circulate in accordance with the rotation of the carriage drive motor 87 to rotate the large pulley of the two-stage pulley 82*b*. The small pulley of the two-stage pulley 82*b* rotates together with the large pulley to drive the carriage drive belt 85 to circulate. In this manner, the rotation of the carriage drive motor 87 is transmitted to the carriage drive belt 85 at a reduction ratio corresponding to a ratio of a diameter of the large pulley and a diameter of the small pulley in the two-stage pulley 82*b*.

The carriage 88 is linked to the carriage drive belt 85. Thus, when the carriage drive belt 85 is driven to circulate, the carriage 88 moves along the X-axis. The carriage 88 is mounted with the recording head 89. By the carriage 88 moving along the X-axis, the recording head 89 moves in the left-right direction, that is, in a +X direction and a −X direction. In other words, the recording head 89 can reciprocate between the one side and the other side in the present disclosure. Additionally, by the main frame 71 moving along the Y-axis, the recording head 89 moves in the front-rear direction, that is, in the +Y direction and the −Y direction. Therefore, the recording device 1 can move the recording head 89 in the front-rear direction and the left-right direction with respect to the table 31. Therefore, liquid such as ink can be discharged onto the entire medium M supported by the table 31.

The recording head 89 includes a plurality of nozzles (not illustrated) that discharge the liquid. These nozzles open at a lower end surface of the recording head 89. When the recording head 89 discharges the liquid from the nozzles, the discharged liquid flies between the lower end surface of the recording head 89, and the medium M placed on the table 31, and lands onto the medium M. A distance between a lower end of the recording head 89 and the medium M is referred to as a recording gap. The recording device 1 has a function of adjusting a size of the recording gap in order to perform recording on the medium M with high quality. Specifically, the recording device 1 operates the lifting/lowering motor 33 to lift or lower the table 31, so that the recording gap is adjusted to be an appropriate size.

The recording device 1 includes a height detector 20. The height detector 20 detects a height of the medium M placed on the table 31. The height of the medium M refers to a position of an upper end of the medium M in the direction along the Z-axis.

The height detector 20 includes a contact plate 24 disposed protruding downward from a lower end of the main frame 71. The contact plate 24 is a plate member elongated in the direction along the X-axis. The contact plate 24 is rotatably attached about the X-axis with respect to the main frame 71. The contact plate 24 is rotated and displaced when brought into contact with the medium M or the medium support portion 31*m*. The contact plate 24 is formed with an arm, and the arm is displaced in association with the displacement of the contact plate 24. The displacement of the arm is detected by a displacement sensor 27 illustrated in FIG. 4. The displacement sensor 27 is provided at the height detector 20. The displacement sensor 27 is, for example, a magnetic sensor, a reflective type optical sensor, or a transmission type optical sensor. The height detector 20 detects the displacement of the contact plate 24 by the displacement sensor 27 detecting the displacement of the arm.

The recording device 1 determines that a relative position of the medium support portion 31*m* with respect to the main frame 71 is high on the Z-axis, when the contact plate 24 is detected to be in contact with the medium M and displaced, while the movement unit 70 moves forward or backward. In this case, the recording device 1 lowers the medium support portion 31*m* by the height movement mechanism 32. This allows the relative position of the medium M with respect to the recording head 89 on the Z-axis to be adjusted, and the recording gap can be adjusted to be an appropriate size. Note that, a lower end of the contact plate 24 is located below the lower end of the recording head 89 by a distance as much as the recording gap having an appropriate size.

In the X-axis, a position of the contact plate 24 overlaps the medium support portion 31*m*. That is, a range W in which the medium support portion 31*m* is located in the X-axis, and the contact plate 24 overlap. Thus, the contact plate 24 can be used to detect the relative position with respect to the recording head 89, for the entire medium M placed on the medium support portion 31*m*.

2. Configuration of First Leg Portion and Second Leg Portion

Figure 2:
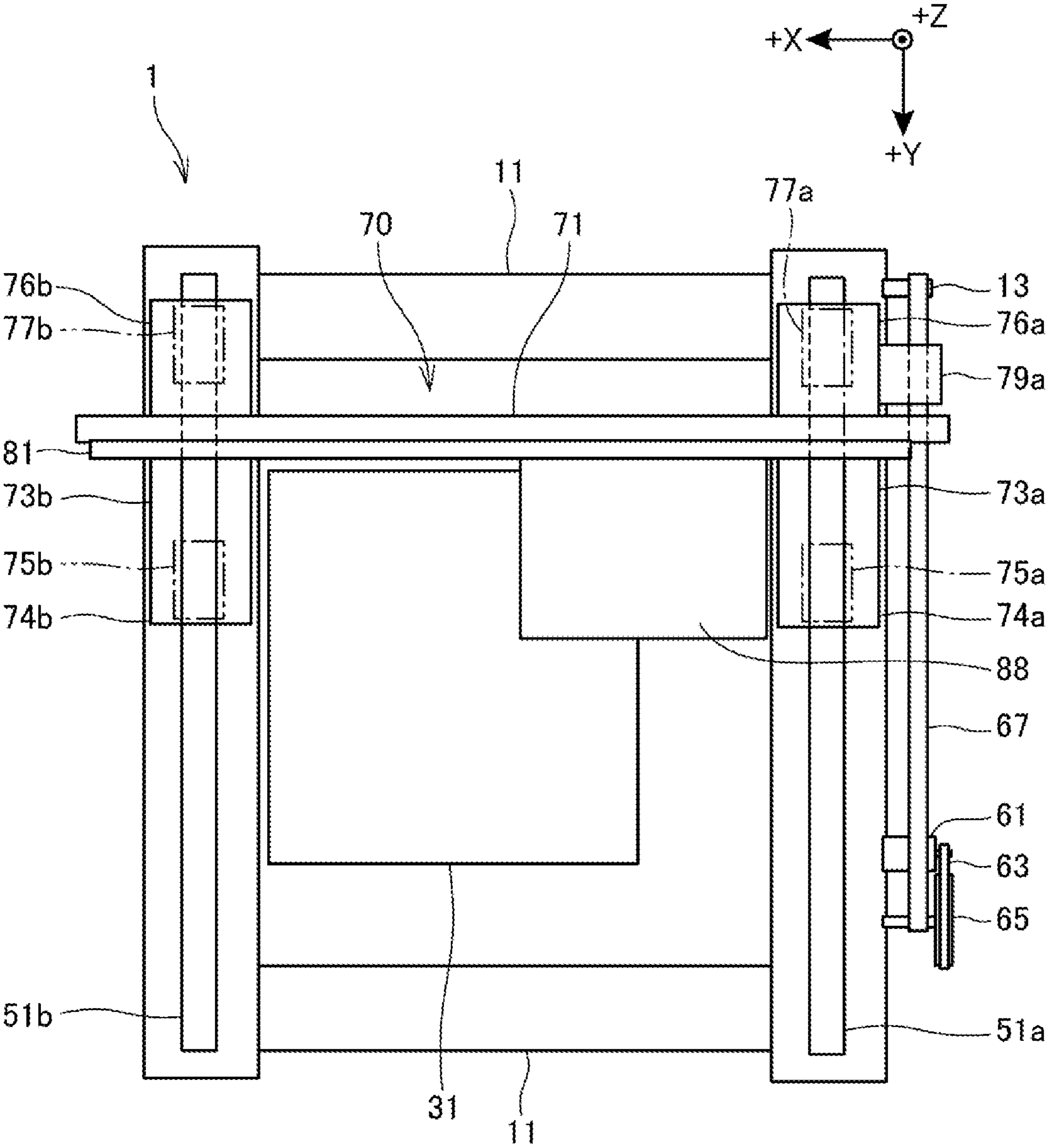
FIG. 2 is a plan view of the recording device according to Exemplary Embodiment 1.
Figure 3:
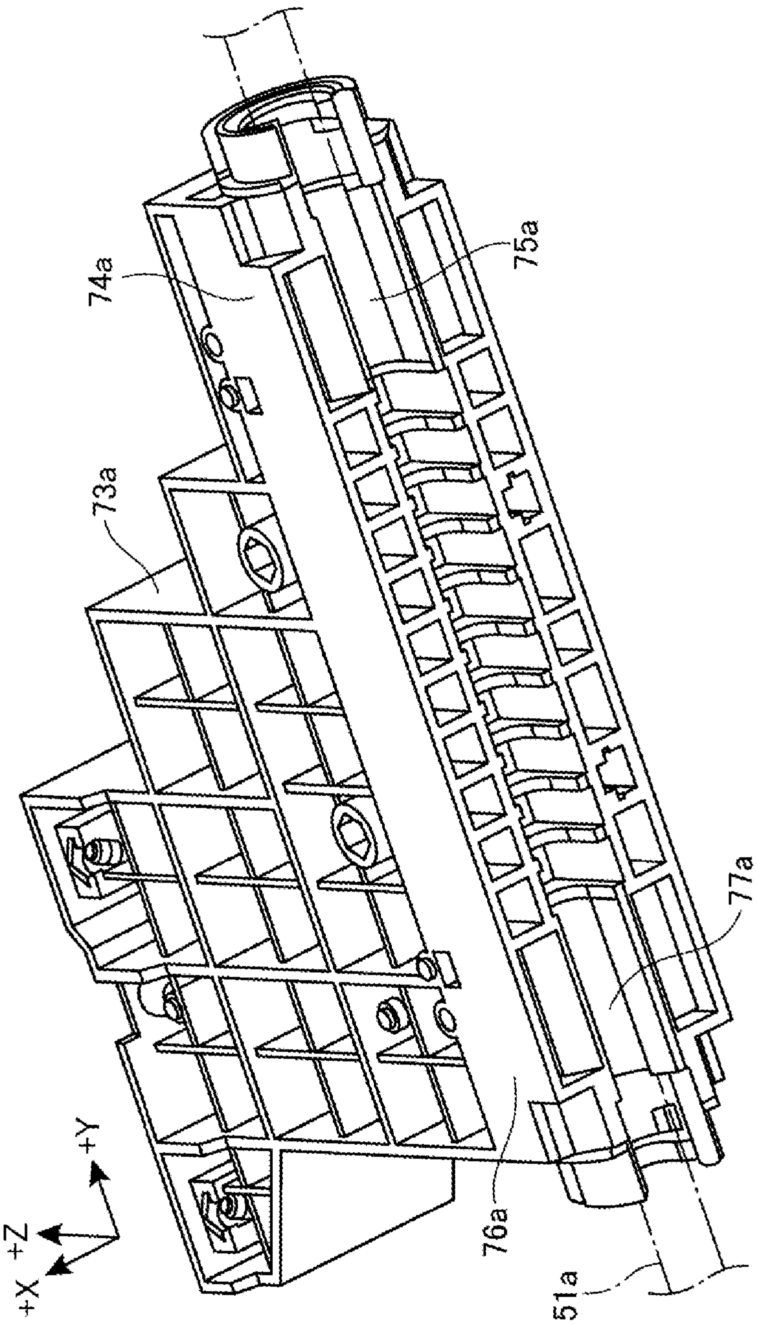
FIG. 3 is a perspective view of a first leg portion according to Exemplary Embodiment 1.

FIG. 2 is a schematic plan view of the recording device 1. FIG. 3 is a perspective view of the first leg portion 73*a*.

As illustrated in FIG. 2 and FIG. 3, the first leg portion 73*a* includes a first drive side bearing 75*a* and a second drive side bearing 77*a*. Each of the first drive side bearing 75*a* and the second drive side bearing 77*a* is provided at a bottom of the first leg portion 73*a*. The first drive side bearing 75*a* is provided at an end portion 74*a* on a front side of the first leg portion 73*a*. The second drive side bearing 77*a* is provided at an end portion 76*a* on a rear side of the first leg portion 73*a*. That is, the first drive side bearing 75*a* and the second drive side bearing 77*a* are provided at the end portion 74*a* and the end portion 76*a* of the first leg portion 73*a*, respectively, in the direction along the Y-axis. Also, both the first drive side bearing 75*a* and the second drive side bearing 77*a* are movably attached to the first guide shaft 51*a*.

Similarly, a bottom of the second leg portion 73*b* is provided with a first driven side bearing 75*b* and a second driven side bearing 77*b*. The first driven side bearing 75*b* is provided at an end portion 74*b* on a front side of the second leg portion 73*b*. The second driven side bearing 77*b* is provided at an end portion 76*b* on a rear side of the second leg portion 73*b*. That is, the first driven side bearing 75*b* and the second driven side bearing 77*b* are provided at the end portion 74*b* and the end portion 76*b* of the second leg portion 73*b*, respectively, in the direction along the Y-axis. Also, both the first driven side bearing 75*b* and the second driven side bearing 77*b* are movably attached to the second guide shaft 51*b*.

In the present exemplary embodiment, each of the first drive side bearing 75*a* and the second drive side bearing 77*a* is a sliding bush. Also, each of the first driven side bearing 75*b* and the second driven side bearing 77*b* is a ball bush.

Each of the first driven side bearing 75*b* and the second driven side bearing 77*b* being the ball bush, includes a ball (not illustrated), and slides by bringing the ball into contact with the second guide shaft 51*b* and rolling the ball. Thus, the first driven side bearing 75*b* and the second driven side bearing 77*b* receive frictional force due to rolling friction from the second guide shaft 51*b*.

On the other hand, each of the first drive side bearing 75*a* and the second drive side bearing 77*a* being the sliding bush, receives friction force due to sliding friction from the first guide shaft 51*a*.

Accordingly, when the movement unit 70 is moved, friction force acting between the first leg portion 73*a* and the first guide shaft 51*a* is greater than friction force acting between the second leg portion 73*b* and the second guide shaft 51*b*.

In this way, by properly using the ball bush and the sliding bush, it is possible to easily increase the friction force acting between the first leg portion 73*a* and the first guide shaft 51*a* to be greater than the friction force acting between the second leg portion 73*b* and the second guide shaft 51*b*.

Also, the bearing is attached to each of the end portion 74*a* in the forward direction, the end portion 76*a* in a backward direction in the first leg portion 73*a*, the end portion 74*b* in the forward direction, and the end portion 76*b* in the backward direction in the second leg portion 73*b*. Accordingly, the first leg portion 73*a* is less likely to contact the first guide shaft 51*a* at a portion other than the first drive side bearing 75*a* and the second drive side bearing 77*a*. Similarly, the second leg portion 73*b* is less likely to contact the second guide shaft 51*b* at a portion other than the first driven side bearing 75*b* and the second driven side bearing 77*b*. This can stabilize the movement of the movement unit 70.

3. Configuration of Control System of Recording Device

Figure 4:
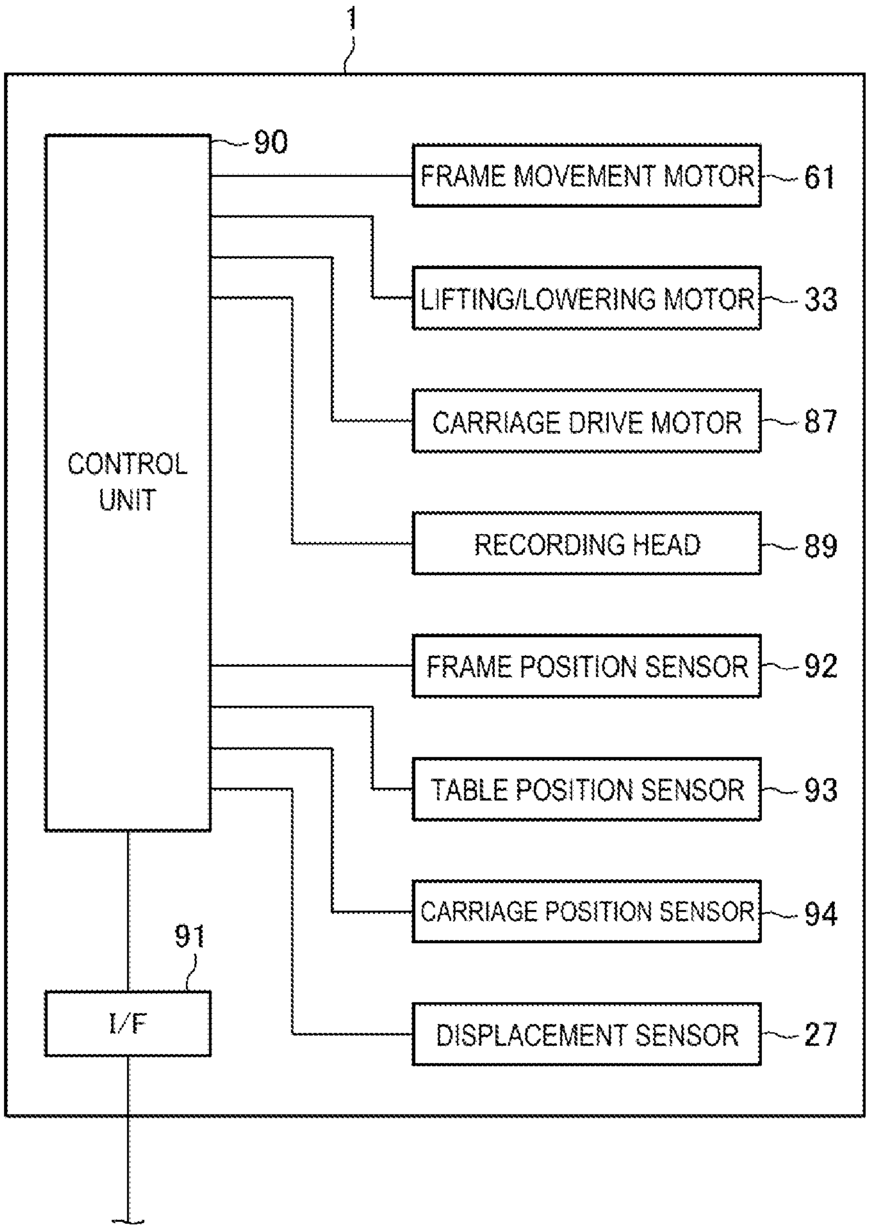
FIG. 4 is a schematic view illustrating a configuration of a control system of the recording device according to Exemplary Embodiment 1.

FIG. 4 is a block diagram of the recording device 1, and illustrates a functional configuration of a control system of the recording device 1.

The recording device 1 includes the control unit 90. The control unit 90 includes a processor such as a CPU (Central Processing Unit) or an MPU (Micro Processing Unit), and a storage unit. The storage unit of the control unit 90 includes a volatile memory, and a non-volatile storage unit. The volatile memory is, for example, a RAM (Random Access Memory). The non-volatile storage unit includes a ROM (Read Only Memory), a hard disk, a flash memory, and the like. The control unit 90 controls each unit of the recording device 1 by executing a program stored in the storage unit.

An interface (I/F) 91 is coupled to the control unit 90. The interface 91 is a communication device that performs wired communication that utilizes cables, or performs wireless communication that utilizes wireless communication lines. The interface 91 communicates with a host computer (not illustrated) to receive recorded data. The recorded data includes data of images or characters that the recorded data 1 records on the medium M, commands for instructing the recording device 1 to perform recording, and other data.

The lifting/lowering motor 33, the frame movement motor 61, the carriage drive motor 87, and the recording head 89 are coupled to the control unit 90. A frame position sensor 92, a table position sensor 93, a carriage position sensor 94, and a displacement sensor 27 are coupled to the control unit 90.

The frame position sensor 92 is a sensor that detects a position of the main frame 71 in the Y-axis. For example, the frame position sensor 92 is a linear encoder disposed along the first guide shaft 51*a*. The table position sensor 93 is a sensor that detects a position of the table 31 in the Z-axis. The table position sensor 93 is, for example, a rotary encoder that detects an amount of rotation of the lifting/lowering motor 33, or a rotary encoder that detects an amount of rotation of the ball screw of the lifting/lowering mechanism 39. The carriage position sensor 94 is a sensor that detects a position of the carriage 88 in the X-axis. For example, the carriage position sensor 94 is a linear encoder disposed along the carriage guide shaft 83. The control unit 90 specifies the position of the main frame 71, the position of the table 31, and the position of the carriage 88, based on detection values of the frame position sensor 92, the table position sensor 93, and the carriage position sensor 94.

The control unit 90 operates each motor based on the recorded data received by the interface 91. Specifically, the control unit 90 controls switching of the rotational direction of the frame movement motor 61, starting and stopping of the rotation of the frame movement motor 61, to move the movement unit 70 along the Y-axis. The control unit 90 controls switching of the rotational direction of the lifting/lowering motor 33, starting and stopping of the rotation of the lifting/lowering motor 33, to move the table 31 along the Z-axis. The control unit 90 controls switching of the carriage drive motor 87, starting and stopping of the rotation of the carriage drive motor 87, to move the carriage 88 along the X-axis. In the control described above, the control unit 90 utilizes the detection values of the frame position sensor 92, the table position sensor 93, and the carriage position sensor 94.

The control unit 90, based on the recorded data received by the interface 91, operates the recording head 89 to discharge liquid.

The control unit 90 adjusts the recording gap while the medium M is placed on the table 31. The control unit 90 operates the frame movement motor 61 to move the main frame 71 forward or backward. The control unit 90 determines whether the contact plate 24 contacts the medium M or the table 31 or not by determining whether the arm is displaced or not based on a detection value of the displacement sensor 27. When determining that the contact plate 24 contacts the medium M or the table 31, the control unit 90 operates the lifting/lowering motor 33 to lower the table 31.

4. Operation of Recording Device

Figure 5:
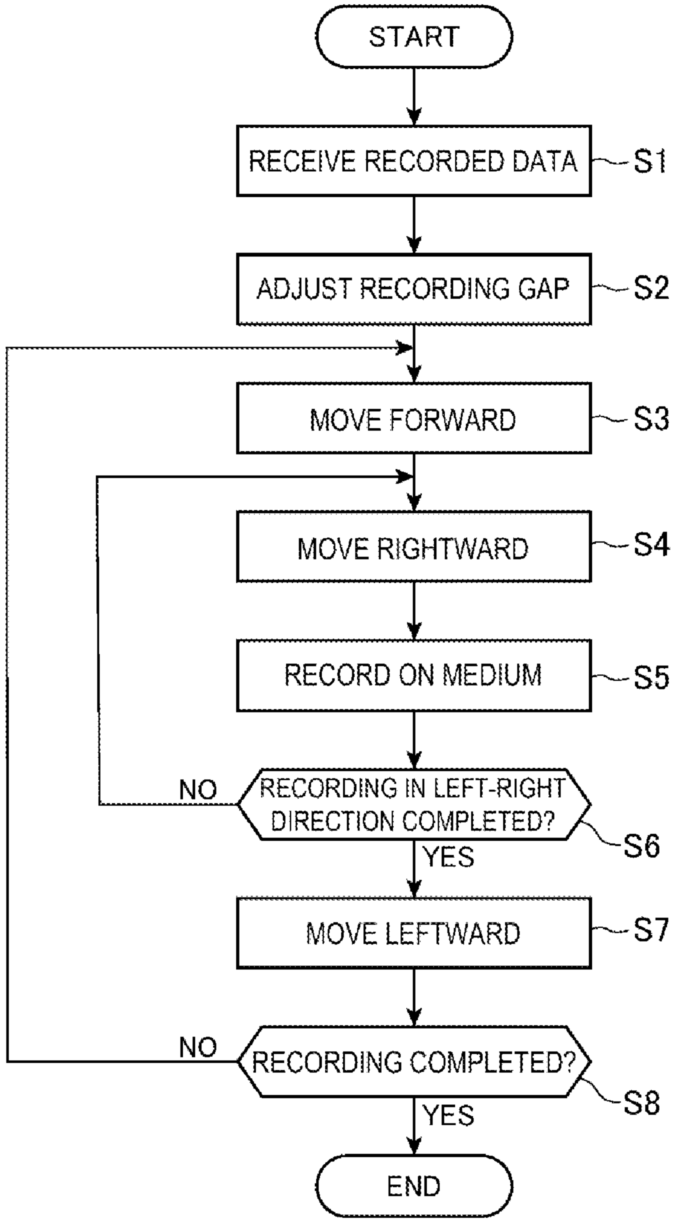
FIG. 5 is a flow chart when the recording device according to Exemplary Embodiment 1 performs printing.

FIG. 5 is a flowchart illustrating operation of the recording device 1, and illustrates operation of the recording device 1 for recording images or characters onto the medium M.

In step S1, the control unit 90 acquires recorded data via the interface 91. The control unit 90 reads a command instructing the recording device 1 to perform recording, from the recorded data.

In step S2, the control unit 90 performs adjustment of a recording gap. When the operation in step S2 is described in detail, the control unit 90 first operates the carriage drive motor 87 to move the carriage 88 to the home position. Furthermore, the control unit 90 operates the frame movement motor 61 to move the movement unit 70 to a rear end. Thus, the contact plate 24 moves to a position that does not overlap the medium support portion 31*m* in plan view.

Next, the control unit 90 operates the lifting/lowering motor 33 to move the table 31 upward. At this time, the control unit 90 causes the table 31 to move so that the medium support portion 31*m* of the table 31 is positioned above the lower end of the contact plate 24.

After that, the control unit 90 operates the frame movement motor 61 to move the movement unit 70 to a front end, as described above. When the control unit 90 detects displacement of the arm meanwhile, the control unit 90, after stopping the frame movement motor 61, operates the lifting/lowering motor 33 to lower the table 31. Thereafter, when the contact plate 24 does not contact the medium M or the table 31, and the control unit 90 does not detect displacement of the arm, the control unit 90 operates the frame movement motor 61 again, to move the movement unit 70 to the front end. By repeating this operation, a position of the lower end of the contact plate 24 and a position of an uppermost portion of the medium M in the vertical direction substantially match. This properly adjusts the recording gap. After adjusting the recording gap, the operation moves to step S3.

In step S3, the control unit 90 operates the frame movement motor 61 to move the movement unit 70 forward from the rear end. When a position in the Y-axis of the recording head 89 reaches a position where recording is performed on the medium M in the Y-axis, the control unit 90 stops the frame movement motor 61. Thus, the movement unit 70 stands still. After the movement unit 70 stands still, the control unit 90 moves to step S4.

The position where recording is performed on the medium M in the Y-axis is, for example, included in the recorded data acquired in step S1 by the recording device 1. The control unit 90 controls movement of the recording head 89 in the Y-axis based on, for example, the position included in the recorded data and a detection value of the frame position sensor 92.

While the movement unit 70 is moved along the y-axis, friction force acting between the first leg portion 73*a* and the first guide shaft 51*a* is greater than friction force acting between the second leg portion 73*b* and the second guide shaft 51*b*. Therefore, difference in resultant force in the front-rear direction is reduced between the first leg portion 73*a* that receives driving force from the frame drive unit 60 and the second leg portion 73*b* that does not directly receive driving force. Accordingly, a position in the front-rear direction of the first leg portion 73*a* and a position in the front-rear direction of the second leg portion 73*b* become less likely to be displaced from each other. Accordingly, the first leg portion 73*a* can be prevented from engaging the first guide shaft 51*a*, and the second leg portion 73*b* can be prevented from engaging the second guide shaft 51*b*.

In addition, in the present exemplary embodiment, a configuration is adopted in which the friction force acting between the first leg portion 73*a* and the first guide shaft 51*a* is large. Accordingly, when the frame movement motor 61 is stopped, the movement unit 70 easily stands still due to the frictional force acting between the first leg portion 73*a* and the first guide shaft 51*a*. As a result, it is possible to prevent the movement unit 70 from vibrating after the frame movement motor 61 is stopped.

In step S4, the control unit 90 operates the carriage drive motor 87 to move the carriage 88 from the home position in the rightward direction. At this time, when a position in the X-axis of the recording head 89 reaches the position where recording is performed on the medium M in the X-axis, the operation moves to step S5.

Note that, the control unit 90 reads, from the recorded data, the position where recording is performed on the medium M in the X-axis. The control unit 90 grasps the position in the X-axis of the recording head 89 by reading a detection value of the carriage position sensor 94.

In step S5, the control unit 90 operates the recording head 89 to perform recording on the medium M. For example, when the recording device 1 is an inkjet printer, in step S5, the recording head 89 jets ink onto the medium M, and the ink adhering to the medium M forms characters, images, or the like included in the recorded data. After step S5 is performed, the operation moves to step S6.

In step S6, the control unit 90 determines whether recording in the direction along the X-axis is completed at the position in the Y-axis of the recording head 89 or not. That is, the control unit 90 determines whether there is no position to perform recording in the rightward direction from the position in the X-axis of the recording head 89 or not when recording is performed in step S5.

In step S6, when the control unit 90 determines that recording in the direction along the X-axis is not completed at the position in the Y-axis of the recording head 89 (step S6: NO), the operation returns to step S4. In this manner, the recording device 1 repeatedly performs from step S4 to step S6, until the control unit 90 determines that recording along the X-axis is completed at the position in the Y-axis of the recording head 89 (step S6: YES).

When the control unit 90 determines that recording along the X-axis is completed at the position in the Y-axis of the recording head 89 (step S6: YES), the operation moves to step S7.

In step S7, the control unit 90 operates the carriage drive motor 87, to move the carriage 88 to the home position in a leftward direction. Then, the operation moves to step S8.

In Step S8, the control unit 90 determines whether recording of the characters or the images onto the medium M is completed or not. That is, the control unit 90 determines whether there is no position to perform recording on the medium M farther in the +Y direction than the position in the Y-axis of the recording head 89 or not.

When determining that recording of the characters or images on the medium M is not completed (step S8: NO), the control unit 90 returns to step S3 and causes the movement unit 70 to move. In this way, the recording device 1 repeatedly performs steps S3 to S8, until recording of the characters or the images on the medium M is completed (step S8).

In step S8, when the control unit 90 determines that recording of the characters or the images on the medium M is completed (step S8), the recording device 1 ends the series of operations.

As described above, in the recording device 1, when the recording head 89 mounted at the carriage 88 moves in the rightward direction, the recording head 89 performs recording on the medium M. On the other hand, when the recording head 89 moves in the leftward direction, the recording head 89 does not perform recording on the medium M. Therefore, when the recording head 89 starts moving to perform recording on the medium M, the recording head 89 is at the home position. Therefore, counteracting force when the recording head 89 starts moving to perform recording on the medium M is mainly received by the first leg portion 73*a*. This counteracting force effectively attenuates due to the frictional force between the first leg portion 73*a* and the first guide shaft 51*a*. In this way, when the recording head 89 performs recording on the medium M, vibration of the movement unit 70 is suppressed.

5. Effects by Exemplary Embodiment

As described above, the recording device 1 according to the exemplary embodiment of the present disclosure includes the medium support portion 31*m* that supports the medium M, the recording unit 80 that records on the medium M, and the movement unit 70 that supports the recording unit 80, and moves relative to the medium support portion 31*m* along the first axis. The recording device 1 includes, the first guide shaft 51*a* provided on the one side of the medium support portion 31*m*, and extending along the first axis, and the second guide shaft 51*b* provided on the other side of the medium support portion 31*m*, and extending along the first axis. The recording device 1 includes the frame drive unit 60 that moves the movement unit 70 along the first axis. The movement unit 70 includes the first leg portion 73*a* movably supported by the first guide shaft 51*a* and the second leg portion 73*b* movably supported by the second guide shaft 51*b*. The frame drive unit 60 causes the driving force to act on the first leg portion 73*a*. The friction force acting between the first leg portion 73*a* and the first guide shaft 51*a* is greater than the friction force acting between the second leg portion 73*b* and the second guide shaft 51*b*.

According to this configuration, the driving force is caused to act only on the first leg portion 73*a* to move the movement unit 70, in the configuration in which the movement unit 70 is supported by the first leg portion 73*a* and the second leg portion 73*b*. At this time, the movement unit 70 during movement can be stabilized by the frictional force acting between the first leg portion 73*a* and the first guide shaft 51*a*. For example, the first leg portion 73*a* and the second leg portion 73*b* can be prevented from engaging the first guide shaft 51*a* and the second guide shaft 51*b*, respectively. Furthermore, vibration of the movement unit 70 when the movement unit 70 is stopped can be suppressed. Accordingly, the movement of the movement unit 70 can be stabilized with a simple configuration. This makes it possible to achieve suppression of manufacturing costs of the recording device 1, a reduction of manufacturing man-hours, and the like.

In the recording device 1, the frame drive unit 60 includes the frame movement motor 61, and the transmission belts 63 and 67 that couples the frame movement motor 61 and the first leg portion 73*a*. In the recording device 1, power of the frame movement motor 61 is transmitted by the transmission belts 63 and 67, so that the first leg portion 73*a* moves along the first guide shaft 51*a*.

According to this configuration, for example, a mechanism for applying driving force to the movement unit 70 can be simply configured, as compared to a case where the frame drive unit 60 applies driving force to the first leg portion 73*a* by a ball screw. Then, the configuration for the movement of the movement unit 70 can be simplified by a combination with the configuration for stabilizing the movement of the movement unit 70 by the friction force acting between the first leg portion 73*a* and the first guide shaft 51*a*.

In the recording device 1, the first leg portion 73*a* includes the first drive side bearing 75*a* attached to the first guide shaft 51*a*, and the first drive side bearing 75*a* is the sliding bush. In the recording device 1, the second leg portion 73*b* includes the first driven side bearing 75*b* attached to the second guide shaft 51*b*, and the first driven side bearing 75*b* is the ball bush.

According to this configuration, the configuration in which the friction force acting between the first leg portion 73*a* and the first guide shaft 51*a* is made greater than the friction force acting between the second leg portion 73*b* and the second guide shaft 51*b* can be achieved by a simple configuration.

In the recording device 1, the first leg portion 73*a* includes the second drive side bearing 77*a* attached to the first guide shaft 51*a*, and the second drive side bearing 77*a* is the sliding bush. In the recording device 1, the second leg portion 73*b* includes the second driven side bearing 77*b* attached to the second guide shaft 51*b*, and the second driven side bearing 77*b* is the ball bush.

According to this configuration, the configuration in which the friction force acting between the first leg portion 73*a* and the first guide shaft 51*a* is greater than the friction force acting between the second leg portion 73*b* and the second guide shaft 51*b* can be achieved by a simple configuration.

In the recording device 1, the first drive side bearing 75*a* and the second drive side bearing 77*a* are provided at the end portions 74*a* and 76*a* of the first leg portion 73*a* in the direction along the first axis, respectively. In the recording device 1, the first driven side bearing 75*b* and the second driven side bearing 77*b* are provided at the end portions 74*b* and 76*b* of the second leg portion 73*b* in the direction along the first axis, respectively.

According to this configuration, the movement unit 70 can be effectively stabilized by the first drive side bearing 75*a*, and the second drive side bearing 77*a*, the first driven side bearing 75*b*, and the second driven side bearing 77*b*, while moving the movement unit 70 along the first axis. Therefore, the movement of the movement unit 70 can be stabilized by a simple configuration.

The recording device 1 includes the control unit 90 that controls the recording unit 80. The recording unit 80 includes the recording head 89 that can reciprocate between the one side and the other side. The control unit 90 causes the recording head 89 to perform recording on the medium M while the recording head 89 moves from the one side to the other side. The control unit 90 does not cause the recording head 89 to perform recording on the medium M, while the recording head 89 moves from the other side to the one side.

According to this configuration, the recording head 89 performs recording on the medium M while the recording head 89 moves from the one side to the other side. Since the counteracting force when the recording head 89 starts moving from the one side to the other side is mainly received by the first leg portion 73*a*, this counteracting force is attenuated by the friction force acting between the first leg portion 73*a* and the first guide shaft 51*a*. Accordingly, vibration of the movement unit 70 is suppressed when the recording head 89 performs recording on the medium M. This makes it possible to improve accuracy of recording by the recording device 1.

6. Other Exemplary Embodiments

The above exemplary embodiment merely describes a specific example in which the present disclosure is applied.

The present disclosure is not limited to the configurations in the exemplary embodiment described above, and can be implemented in various aspects without departing from the gist of the disclosure.

For example, in the exemplary embodiment described above, the configuration has been described in which the first leg portion 73*a* includes the first drive side bearing 75*a* and the second drive side bearing 77*a*, which are both the sliding bushes. This is an example, and for example, the second drive side bearing 77*a* may be a ball bush. According to this configuration, the first leg portion 73*a* includes a combination of the sliding bush and the ball bush, thereby adjusting magnitude of frictional force acting between the first leg portion 73*a* and the first guide shaft 51*a*. Accordingly, by combining a ball bush and a sliding bush being ready-made products, the magnitude of the friction force acting between the first leg portion 73*a* and the first guide shaft 51*a* can be optionally adjusted. Accordingly, manufacturing costs can be suppressed, and a degree of freedom of design can be improved.

Also, for example, in the above-described exemplary embodiment, the configuration has been described in which the first leg portion 73*a* includes the first drive side bearing 75*a* and the second drive side bearing 77*a*, and the second leg portion 73*b* includes the first driven side bearing 75*b* and the second driven side bearing 77*b*, but this is an example. The first leg portion 73*a* may include a third drive side bearing, and the second leg portion 73*b* may include a third driven side bearing. Thus, as far as a configuration is adopted in which frictional force acting between the first leg portion 73*a* and the first guide shaft 51*a* is greater than the frictional force acting between the second leg portion 73*b* and the second guide shaft 51*b*, the number of bearings included in each of the first leg portion 73*a* and the second leg portion 73*b* is not limited to two.

Further, for example, in the above-described exemplary embodiment, as the configuration in which the recording device 1 moves the movement unit 70 along the Y-axis, the configuration has been described in which the frame movement motor 61, the transmission belt 63, the gearbox 65, and the transmission belt 67 are used, but this is an example. For example, the recording device 1 may be configured such that, the first guide shaft 51*a* is constituted by a ball screw, a nut that engages the ball screw is fixed to the first leg portion 73*a*, and the first guide shaft 51*a* is rotated by driving force of the frame movement motor 61. Similarly, the transmission mechanism 82 has been described as the configuration in which the recording device 1 causes the recording unit 80 to perform scanning in the X-axis direction, but this is an example. In place of the transmission mechanism 82, a configuration may be adopted in which a ball screw and a nut are used, or the carriage 88 may be moved by a linear motor. In addition, as the configuration for lifting and lowering the table 31, the height movement mechanism 32 has been described in which the lifting/lowering mechanism 39 is driven by the lifting/lowering belt 37, but this is an example. For example, the recording device 1 may be configured to lift and lower the table 31 by a rack-and-pinion mechanism. The medium support portion 31*m*, which is the upper surface of the table 31, is not limited to a plane. For example, the table 31 may be a seat including a holding tool such as a claw or a belt that holds the medium M. Further, the medium support portion 31*m* may be, for example, a recessed portion into which the medium M is fitted. The other mechanical configurations of the recording device 1 can be changed appropriately to a configuration that provides similar effects to those of the present disclosure.

The configuration of the recording device 1 including the frame position sensor 92, the table position sensor 93, and the carriage position sensor 94 illustrated in FIG. 4 is an example. For example, the recording device 1 may be configured to specify a position of the main frame 71 by detecting an amount of rotation of the frame movement motor 61. Similarly, the recording device 1 may be configured to specify a position of the table 31 by detecting an amount of rotation of the lifting/lowering motor 33, or may be configured to specify a position of the carriage 88 by detecting an amount of rotation of the carriage drive motor 87.

Such a configuration may be adopted that at least some of the function blocks illustrated in FIG. 4 are achieved with hardware, or achieved together with hardware and software. The processing unit in the flowchart illustrated in FIG. 5 is obtained by dividing processing in accordance with a main processing content to facilitate the understanding of the operation of the recording device 1. Thus, the exemplary embodiment is not limited by a method for dividing processing into processing units and a name illustrated.

What is claimed is:

1. A recording device, comprising:

a medium support portion configured to support a medium;

a recording unit configured to perform recording on the medium;

a movement unit configured to support the recording unit, and move relative to the medium support portion along a first axis;

a first guide shaft provided on one side of the medium support portion, and extending along the first axis, and a second guide shaft provided on another side of the medium support portion, and extending along the first axis; and a driving unit configured to move the movement unit along the first axis, wherein the movement unit includes a first leg portion movably supported by the first guide shaft, and a second leg portion movably supported by the second guide shaft, the driving unit applies driving force to the first leg portion, and friction force acting between the first leg portion and the first guide shaft is greater than friction force acting between the second leg portion and the second guide shaft.

2. The recording device according to claim 1, wherein the driving unit includes a moving motor, and a moving belt coupling the moving motor and the first leg portion, and power of the moving motor is transmitted by the moving belt, and thus the first leg portion moves along the first guide shaft.

3. The recording device according to claim 1, wherein the first leg portion includes a first drive side bearing attached to the first guide shaft, and the first drive side bearing is a sliding bush, and the second leg portion includes a first driven side bearing attached to the second guide shaft, and the first driven side bearing is a ball bush.

4. The recording device according to claim 3, wherein the first leg portion includes a second drive side bearing attached to the first guide shaft, and the second drive side bearing is a sliding bush, and the second leg portion includes a second driven side bearing attached to the second guide shaft, and the second driven side bearing is a ball bush.

5. The recording device according to claim 4, wherein the first drive side bearing, and the second drive side bearing are respectively provided at end portions of the first leg portion in a direction along the first axis, and the first driven side bearing, and the second driven side bearing are respectively provided at end portions of the second leg portion in the direction along the first axis.

6. The recording device according to claim 3, wherein the first leg portion includes a second drive side bearing attached to the first guide shaft, and the second drive side bearing is a ball bush, and the second leg portion includes a second driven side bearing attached to the second guide shaft, and the second driven side bearing is a ball bush.

7. The recording device according to claim 3, comprising a control unit configured to control the recording unit, wherein the recording unit includes a recording head configured to reciprocate between the one side and the other side, and the control unit causes the recording head to perform recording on the medium while the recording head moves from the one side to the other side, and does not cause the recording head to perform recording on the medium while the recording head moves from the other side to the one side.

* * * * *